United States Patent [19]

Tanioka

[11] Patent Number: 4,959,868
[45] Date of Patent: Sep. 25, 1990

[54] IMAGE PROCESSING SYSTEM

[75] Inventor: Hiroshi Tanioka, Tokyo, Japan

[73] Assignee: Canon Kabushiki Kaisha, Tokyo, Japan

[21] Appl. No.: 214,876

[22] Filed: Jul. 5, 1988

Related U.S. Application Data

[63] Continuation of Ser. No. 790,309, Oct. 22, 1985, abandoned.

[30] Foreign Application Priority Data

Oct. 31, 1984 [JP] Japan .................................. 59-229265
Oct. 31, 1984 [JP] Japan .................................. 59-229266
Sep. 4, 1985 [JP] Japan .................................. 60-196182

[51] Int. Cl.$^5$ .............................................. G06K 9/36
[52] U.S. Cl. ................................ 382/41; 382/9; 382/56; 358/470; 358/469
[58] Field of Search ............... 382/9, 48, 56, 41; 358/263, 261, 282, 283, 470, 469, 456

[56] References Cited

U.S. PATENT DOCUMENTS

| | | | |
|---|---|---|---|
| 4,251,837 | 2/1981 | Janeway, III | 382/50 |
| 4,377,803 | 3/1983 | Lotspiech et al. | 382/9 |
| 4,504,972 | 3/1985 | Scherl et al. | 382/9 |
| 4,513,442 | 4/1985 | Scherl | 382/9 |
| 4,547,811 | 10/1985 | Ochi et al. | 382/9 |
| 4,555,802 | 11/1985 | Fedak et al. | 358/263 |
| 4,568,983 | 2/1986 | Bobick | 358/263 |
| 4,577,235 | 3/1986 | Kannapell et al. | 358/282 |

Primary Examiner—David K. Moore
Assistant Examiner—Michael Razavi
Attorney, Agent, or Firm—Fitzpatrick, Cella, Harper & Scinto

[57] ABSTRACT

There is an image processing system comprising: a storage device to store the binarized image; a dividing circuit to divide the storage space in the storage device into rectangular meshes of a predetermined size in which at least one character is included; a discriminating circuit to discriminate the image area included in the mesh; and an encoder to compress and encode the image area on the bases of the first or second encoding method in accordance with the result of the discrimination of the discriminating circuit. This system may include the first or second decoder to decode the image information in correspondence to the first or second encoder. The second encoding method is based on a dot level. When continuous white or blank meshes exist in the image area, namely, no black pixel exists in the image area, the run length, i.e., the number of blank meshes is encoded. With this system, the binarized image signal can be data compressed and stored with a high degree of efficiency and can be decoded as necessary, and a data compressibility is improved.

19 Claims, 7 Drawing Sheets

IMAGE PROCESSING SYSTEM

This application is a continuation of application Ser. No. 790,309 filed Oct. 22, 1985 now abandoned.

BACKGROUND OF THE INVENTION

1. Field of the Invention

The present invention relates to an image processing system in which a binarized image signal is encoded on a block unit basis and stored and further this encoded signal is decoded as necessary.

2. Description of the Prior Art

For image information including character and graphic information, it is desirable that after such image information is read by a reading apparatus such as a copying machine or the like and binarized, when it is filed in, e.g., an optical disk device or the like, this binarized data be encoded and compressed. However, since the redundancy of image signals differs in dependence on image tone, compression efficiency will deteriorate if data compression is formed by only a single encoding method as in a conventional manner with regard to, for example, all of a single image in which characters, photographs, figures, etc. mixedly exist.

SUMMARY OF THE INVENTION

The present invention is made in consideration of the foregoing points and is intended to remove the above-mentioned drawback.

It is an object of the present invention to provide an image processing system in which the binarized image signal is data-compressed and stored with a high degree of efficiency, and the image signal is decoded as necessary.

Another object of the invention is to provide an image processing system in which the binarized image signal is data-compressed and stored with a high degree of efficiency and further the image signal is decoded.

According to one aspect of the invention, these objects are attained by means of an image processing system in which the binarized image signal into meshes and encode the number of blocks of the continuous meshes with respect to the blank area in the mesh, namely, the area where black pixels due to the background or the like are not included.

More specifically, according to one aspect of the invention is provided an image processing system comprising: dividing means for dividing a read image of an original into at least two kinds of areas in accordance with an image tone of this read image; encoding means for encoding those areas on the basis of different encoding methods, respectively; and storage means for storing the encoded image data, wherein the storage means adds the kind of area and the size of the minimum area in this area as well as the image data for every area and can store those data.

According to another aspect of the invention is provided an image processing system comprising: means for storing a binarized image; discriminating means for dividing the storage space of said storage means into rectangular meshes of a predetermined size and discriminating the image information included in the mesh; and encoding means for compressing and encoding the image area on the basis of a first or second encoding method in accordance with the result of the discrimination of the discriminating means, wherein for the particular data encoded by the encoding means, a code indicative of the run length of the data can be added to the code, and compressibility can be further raised.

According to another aspect of the invention is to provided an image processing system comprising: storage means for storing a binarized image; dividing means for dividing the storage space of the storage means into rectangular meshes in each of which at least one character is included; discriminating means for discriminating the image area included in the mesh; and encoding means for compressing and encoding the image area on the basis of a first or second encoding method in accordance with the result of the discrimination of the discriminating means.

DETAILED DESCRIPTION OF THE PREFERRED EMBODIMENT

An embodiment according to the present invention will now be described in detail hereinbelow with reference to the drawings. The system used in this application may be a single apparatus or an entire system of such construction.

Figure 1:
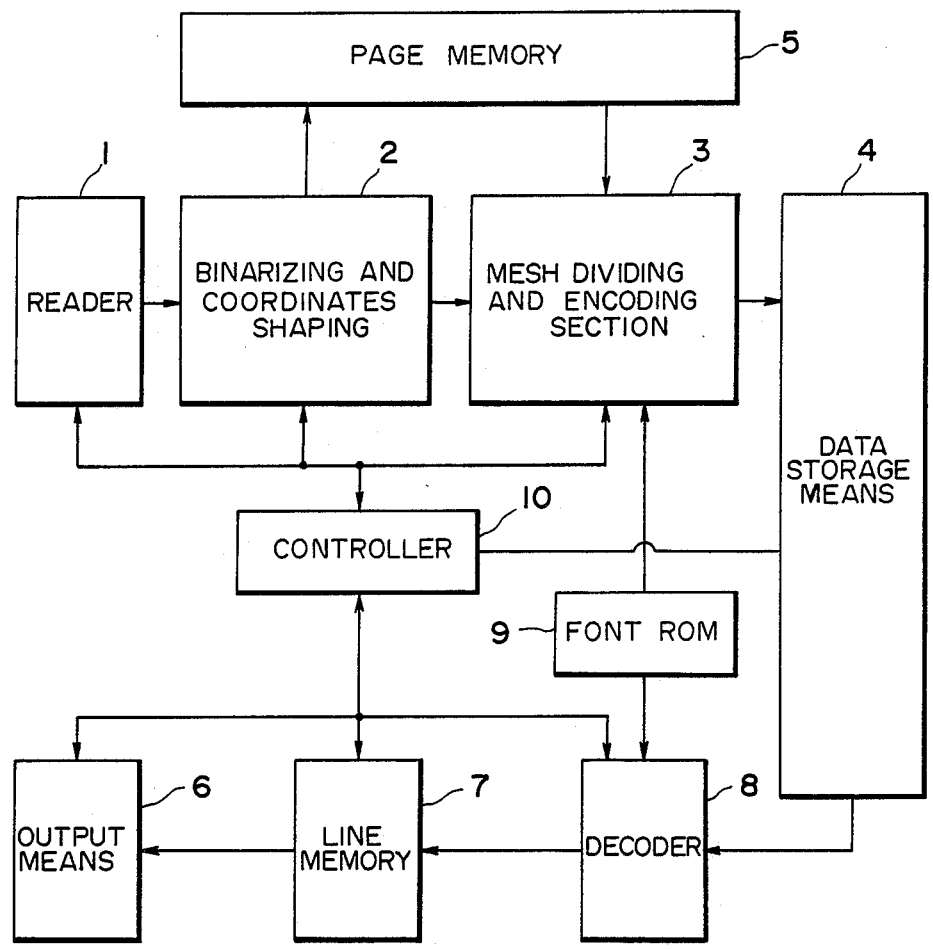
FIG. 1 is a block diagram showing an embodiment according to the present invention.

FIG. 1 is a block diagram of an image processing system as one embodiment.

A reference numeral 1 denotes an image reading section consisting of a solid-state image pickup device such as a CCD or the like. The image read is binarized by a binarizing and coordinate shaping section 2. In the case where a slanted image is inputted, it is rotated and subjected to a coordinate shaping process in order to coordinate the character string with the address space coordinates in a page memory 5, and thereafter it is stored in the page memory 5. Numeral 3 indicates a section which is characteristic in the present invention and is named as a mesh dividing and encoding section. The coded data is stored in data storage means 4.

A decoder 8 reads out the type fonts stored in a font ROM 9 on the basis of the size of mesh and of the encoded data and sequentially reproduces and stores the information as a type string into the space of a line memory 7. This type string is outputted as a visual image by output means 6.

Figure 2:
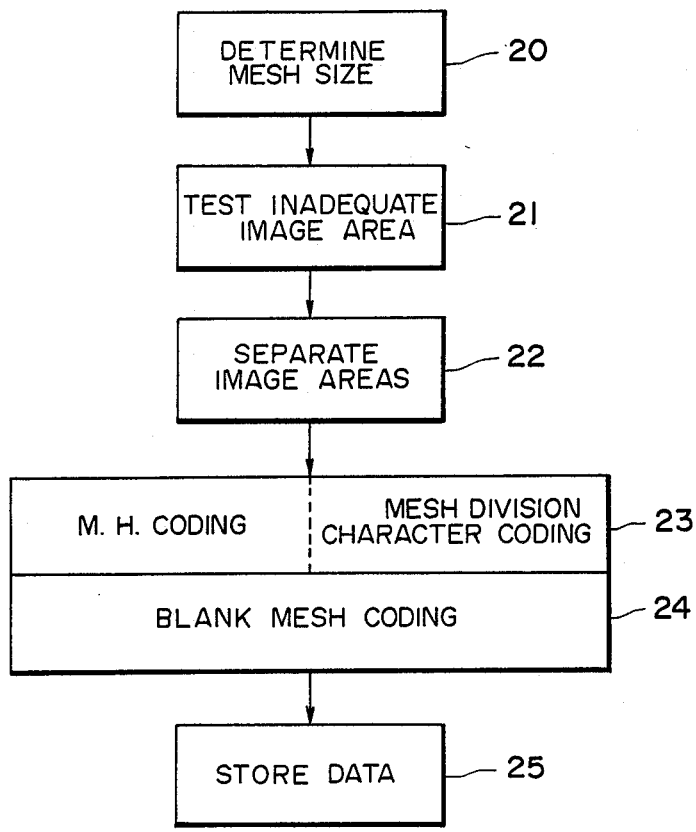
FIG. 2 is a schematic diagram showing the processing flow of the embodiment of FIG. 1.

An outline of the image process in the mesh dividing and encoding section 3 of the embodiment will be described for every step on the basis of the flowchart of FIG. 2.

<STEP>—Determination of the mesh size:

Histograms of the number of black dots in both the x and y directions from the image data D(x,y) of one page stored in the page memory 5 are obtained. Reference characters x and y are proper orthogonal coordinate axes in the page memory 5.

To obtain the histogram in the x direction, the number of black dots for all y coordinate values with respect to a certain x coordinate value is counted. This counting operation is performed for all x coordinate values, thereby producing the histogram in the x direction. To produce the histogram in the y direction as well, the number of black dots for all x coordinate values with respect to a given y coordinate value is obtained.

Figure 3:
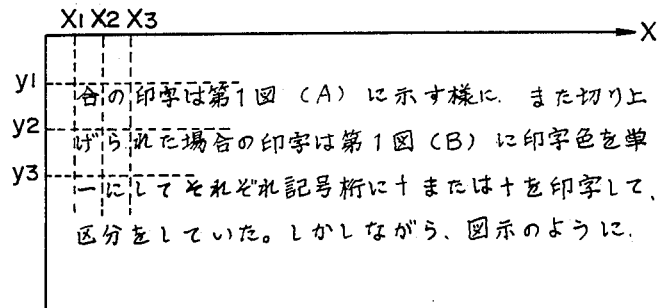
FIG. 3 is a diagram visually expressing an input original in a page memory.
Figure 4A:
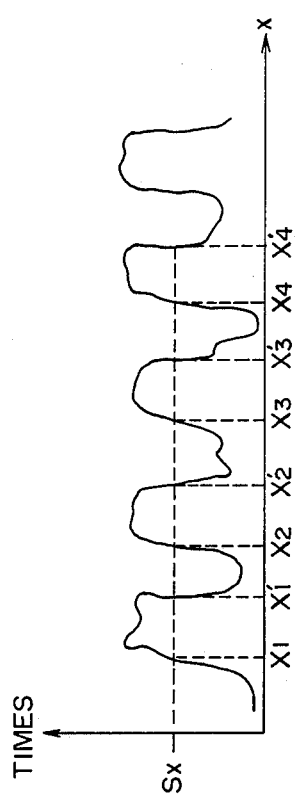
FIGS. 4(a) and 4(b) are histograms in the x and y directions, respectively.
Figure 4B:
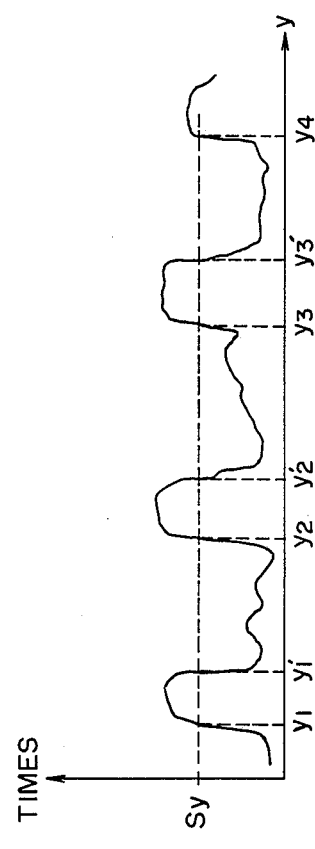

By applying the above-mentioned method to the character string of a sentence as shown in FIG. 3, a histogram in the x direction is obtained as shown in FIG. 4(a) and a histogram in the y direction is derived as shown in FIG. 4(b). It can be considered that the "valleys" in the histograms of FIGS. 4(a) and 4(b) are the spaces between characters and between lines, respectively. As shown in FIG. 3, in the case of a sentence in which the sizes of characters are generally constant, the histograms are periodic as shown in FIGS. 4(a) and 4(b). However, in the case where characters of different sizes mixedly exist or where figures or the like are included, the shapes of the histograms lose the periodic property.

Figure 5A:
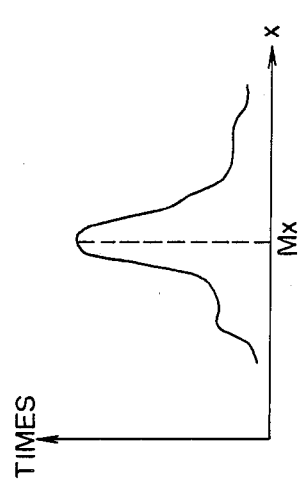
FIGS. 5(a) and 5(b) are diagrams showing methods of determining the sizes of meshes in the x and y directions, respectively.
Figure 5B:
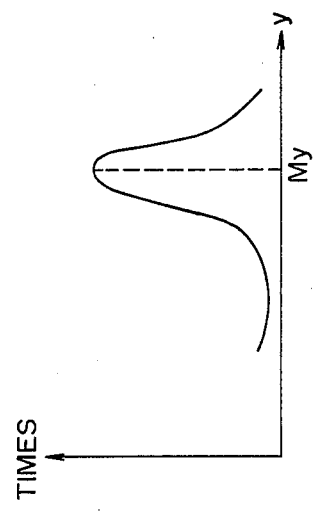

In general, about eighty percent of all characters in one page have the same size. Therefore, for the total distribution of the number of black dots in each direction shown in FIG. 3, if predetermined threshold values $S_x$ and $S_y$ are used, the coordinates $(x_1, y_1), (x_2, y_2), (x_3, y_3), \ldots$ of the positions of characters will be derived. Therefore, by obtaining $(x_2-x_1), (x_3-x_2), (x_4-x_3), \ldots, (x_n-x_{n-1}), \ldots$, and $(y_2-y_1), (y_4-y_3), (y_5-y_4),$ and $(y_2-y_1), (y_3-y_3), (y_5-y_4), (y_n-y_{n-1}), \ldots$, histograms as shown in FIGS. 5(a) and 5(b) are derived. Assuming that the coordinate values in which the times become maximum are $M_x$ and $M_y$, the size of mesh which is obtained in step 20 is preferably set to $M_x$ pixels in the x direction and $M_y$ pixels in the y direction. It will be appreciated that if the character string is divided by way of the meshes of the foregoing size, almost of the characters can be included in the mesh one by one.

Further, by obtaining $(x_1-x_1'), (x_2-x_2'), \ldots, (x_n-x_n')$ and $(y_1, y_1'), (y_2-y_2'), \ldots, (y_n-y_n')$ and producing the histograms and then deriving the maximum values in a manner similar to that mentioned above, the size of character can be determined with a higher degree of accuracy. The character area decided in this manner is thus $M_x' \times M_y'$ in FIG. 6.

Figure 6:
FIG. 6 is a diagram showing an input original divided by way of the meshes decided upon.

FIG. 6 shows the state in the case where the text of FIG. 3 is divided into meshes of the size $M_x \times M_y$ (also shows the area $M_x' \times M_y'$ recognized as the character area). As will be obvious from FIG. 6, the mesh according to the invention can include therein not only one character but also the blank portion of the background. Data including this blank portion and character is encoded, so that compression efficiency by way of the encoding method of the invention is extremely improved, as will be explained hereinlater. Further, the continuous blank portions are encoded and compressed on the basis of the blank portions and of the number of blank portions, thereby allowing the compression efficiency to be remarkably improved.

On the other hand, although a fairly large compression efficiency can be expected according to the foregoing encoding method for the document in which the sizes of characters are uniform, for general documents, even if all of one page is divided by use of the foregoing meshes and encoded, improvement of the compression efficiency cannot be expected because it is quite a rare case where the sizes of characters are uniform as shown in FIG. 3, and because the areas of figures and photographs are also included in ordinary documents.

Therefore, in the next step 21 in FIG. 2, a detection algorithm to detect the areas where the mesh of the size decided as mentioned above cannot be applied will be explained in detail.

<STEP 21>—Determination of the inadequate image area due to the mesh division:

The following cases can be mentioned as the image areas where the mesh division is improper.
(1) Characters (sentences) of different sizes
(2) Areas of figures and photographs
(3) Character area where the background is not white (background + characters)
(4) Proportional-printed original Step 21 relates to a method of discriminating the images in the above items (1) to (4) with regard to the case where they mixedly exist in regular character string as shown in FIG. 6. This method will be explained hereinbelow.

Figure 7:
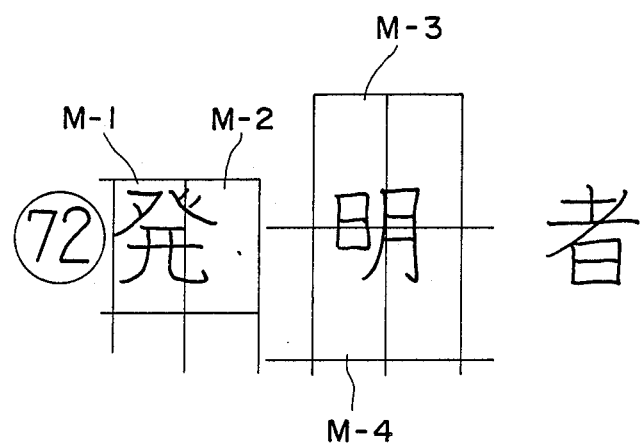
FIG. 7 is a diagram in the case where the same mesh is applied to characters of different sizes.

In the case where the character string of FIG. 6 and the characters of different sizes (FIG. 7) in the item (1) mixedly exist, if the mesh $M_x \times M_y$ derived by the foregoing method in step 20 is applied to the character string of different sizes, it will have been divided as shown in M-1 to M-4 in FIG. 7.

For example, with respect to the mesh M-1, a part of a character is also included in the blank portion (blank between lines) in the lower portion of the mesh. Therefore, by specifying the character area in the mesh and checking the presence/absence of the black pixels in the portion other than the character area, the image area including the characters of different sizes can be discriminated. At this time, in determination of the character area in the mesh, the mesh constituted by the smaller one of $M_x$ and $M_y$, namely, $M_x \times M_x$ since $M_x < M_y$ in FIG. 6, may be decided to be the character area in the mesh. To further accurately obtain the image area, the presence/absence of the black pixels in the area other than the character area may be directly checked from the character area $M_x' \times M_y'$ instead of obtaining only the character interval as mentioned above.

Even for the character of different size, there can be a case where the black dots hardly exist in the area other than the character area and it is impossible to determine that the image area is inadequate, as shown in the mesh M-4 in FIG. 7. However, since a large number of black dots exist in the area other than the character area in the adjacent mesh M-3, it is obviously possible to decide that the image area is improper for this mesh, so that the meshes M-3 and M-4 can be determined to be inadequate as the mesh. In other words, in step 21, adequateness is discriminated for every mesh. In the next step 22, the inadequate mesh is two-dimensionally discriminated and the inadequate area can be decided.

Similarly, the inadequate areas can be also discriminated due to the above-mentioned process with respect to the areas of figures and photographs in item (2) and to the area where image information exists in background in the item (3).

However, in FIG. 6, in the case where a straight line which is parallel to, e.g., the x axis exists in the character area of the adjacent mesh, the inadequate area cannot be discriminated by way of the foregoing process. Therefore, $M_x$ and $M_y$ are compared and a check is made to see if a few black dots exist on the side in the direction of the axis of the longer one, namely, the y axis of the mesh in the illustrated embodiment. If they exist, the mesh area to be divided by the y axis is decided to be inadequate, thereby enabling the above-mentioned straight line to be discriminated.

STEP 22>---Separation of the encoding area:

In step 22, an image is divided into half areas depending on the difference in coding methods on the basis of inadequateness determined in step 21.

(1) The area where encoding is performed in the pixel dot dimension by way of an MH (Modified Huffman system), MR (Modified R.E.A.D. system), etc.

(2). The area where characters are encoded on the basis of the above-mentioned mesh division.

Namely, most of the portion of one page (including the white area) is mesh-divided while including one character, in dependence on the size of character, according to the present invention, so that a coding process which will be explained later can be performed. However, it is desirable to apply the existing coding process in the dot dimension for the middle tone portions or the areas of figures and diagrams.

Figure 8:
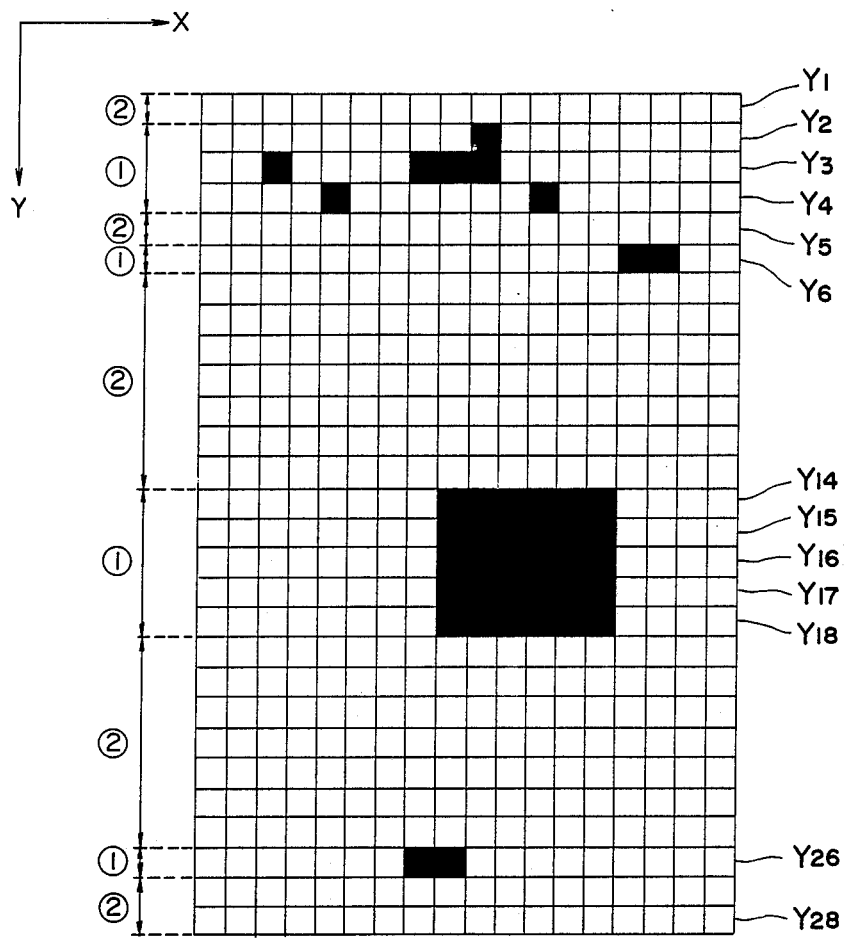
FIG. 8 is a diagram showing an example of the result in the case where an image signal of one page divided into meshes is determined to be adequate or inadequate.

For example, as shown in FIG. 8, when one page is divided into meshes and it is assumed that the meshes (represented by □) which are determined to be inadequate in step 21 exist at a few positions, the coding area will be separated, for example, in the following manner. The continuous mesh columns in the x direction are named as $Y_1$ mesh line, $Y_2$ mesh line, ... $Y_{28}$ mesh line. If at least one inadequate mesh exists in a particular one of these mesh lines, that mesh line is subjected to the coding process (1) in the dot dimension with regard to the x direction. In this embodiment, the MH coding process is carried out.

Therefore, in FIG. 8, the mesh lines $Y_2$ to $Y_4$, $Y_6$, $Y_{14}$ to $Y_{18}$, and $Y_{26}$ are subjected to the MH coding process and the other mesh lines are all subjected to the mesh-division character coding process according to the present invention.

In addition, in the mesh division according to the invention, the area where no black dot exists is handled as an adequate mesh even if this area is an image, so that the compression efficiency can be improved. To raise the separation accuracy, the adequate mesh lines of two columns in the y direction which sandwich the inadequate mesh line can be handled as the inadequate mesh lines and the MH coding process can be also executed.

<STEP 23>—Mesh division character coding:

In <STEP 21> and <STEP 22>, one page is divided into $M_x \times M_y$ and the discrimination regarding whether or not the mesh is mesh including one character has been finished. Therefore, in step 23, the MH coding process is performed on the inadequate meshes, and the character is recognized for every mesh with respect to the characters in the adequate meshes.

Various kinds of methods have already been proposed as such a kind of character recognition method and such recognition can be realized fundamentally with any such method. In this embodiment, a DP (Dynamic Pattern) matching method is used. The DP matching method is a pattern matching method based on the dynamic programming method. According to this DP matching method, when the distance between an input pattern and the registered dictionary pattern is calculated, the pattern is nonlinearly extended and contracted, thereby matching the pattern on the basis of the distance in the case where the pattern is seen as a whole, becoming minimum. About two thousand Chinese characters in common use and other fonts are used as the dictionary patterns. The recognized characters are encoded to, for example, 2×ASCII codes each consisting of two bytes.

<STEP 24>—Blank mesh run coding:

When it is recognized in step 23 that the information in the mesh is the blank pattern, not only is this mesh encoded to the code corresponding to the blank but also the run length of the continuous blank meshes is counted and this run length is subjected to, e.g., the MH coding process and then added. More specifically, in most cases, existence of the blank meshes denotes a few blank lines in association with the end of a sentence (or the end of a paragraph) within one line or with the end of paragraph, or the blank lines existing above and below a page of text or images. In any case, it is a rare case where a single mesh only, blank and it is statistically known that in many cases, a few continuous blank meshes, or even enough continuous blank meshes to make up an entire line exist. Therefore, it is another feature of the present invention that with respect only to those blank meshes, the number of continuous meshes is encoded and added, thereby enabling the data compression efficiency to be further improved as compared with the method in which all of the respective blank meshes are subjected to the coding process of two bytes. Moreover, as compared with a conventional block coding method, by encoding a larger area as one block with respect only to the blank block, the data compression can be performed.

<STEP 25>—Store data:

Storage in the data storage means is performed for every page and one page is further divided into records for every mesh line. As a parameter necessary for every page, the size $M_x$ and $M_y$ of the mesh is considered. As a parameter necessary for every mesh line, there is a code type flag indicating whether the coding process has been applied or not. This code type flag is added to the beginning of each mesh line. In the embodiment, the code type flag may be two kinds of coding data which are switched for every mesh line in order to apply the MH-coding process for the meshes which are subjected to the coding process of the pixel dots.

Figure 9A:
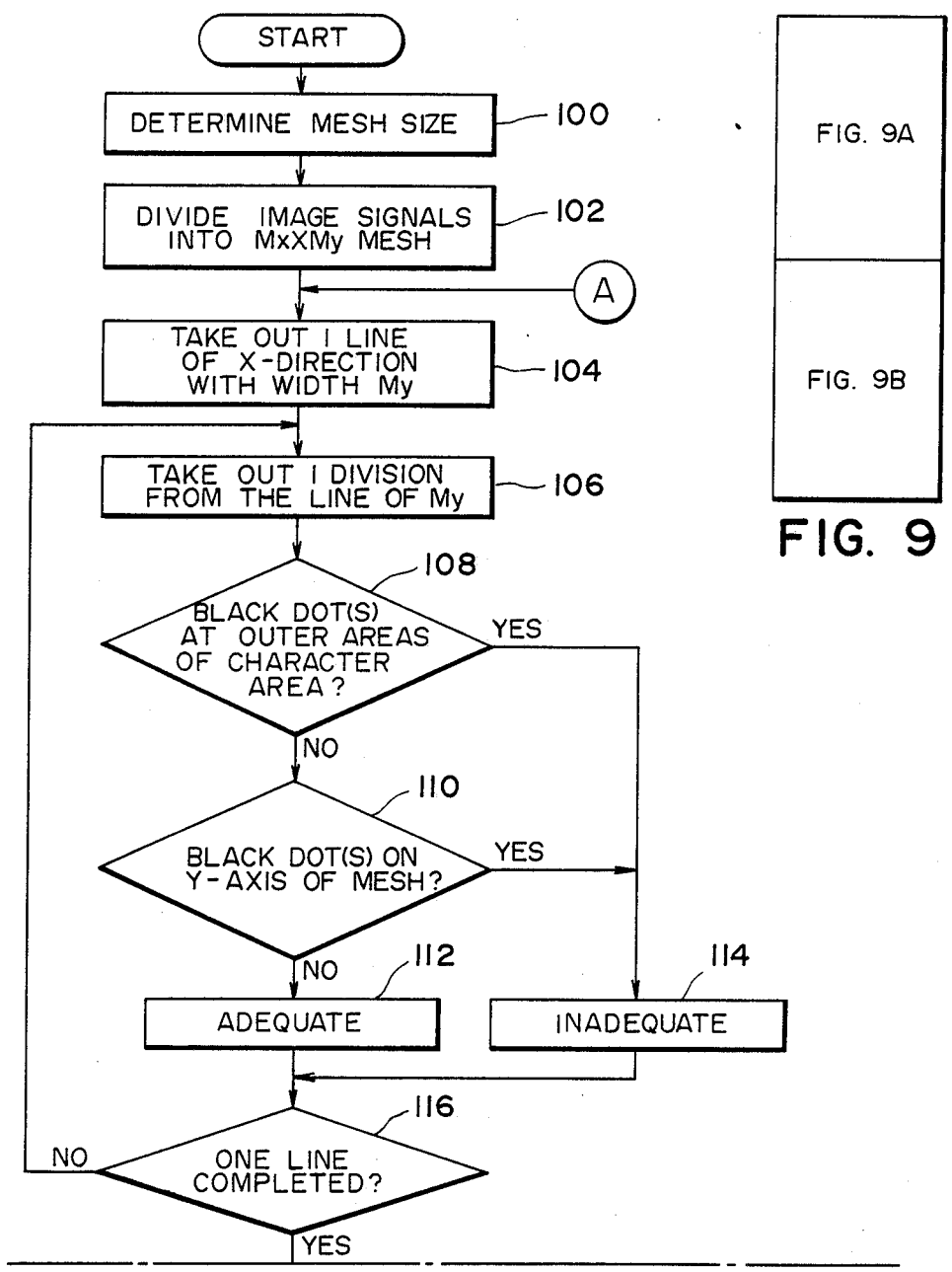
FIG. 9 consisting of FIGS. 9A and 9B, is a control flow chart for a control section.
Figure 9B:
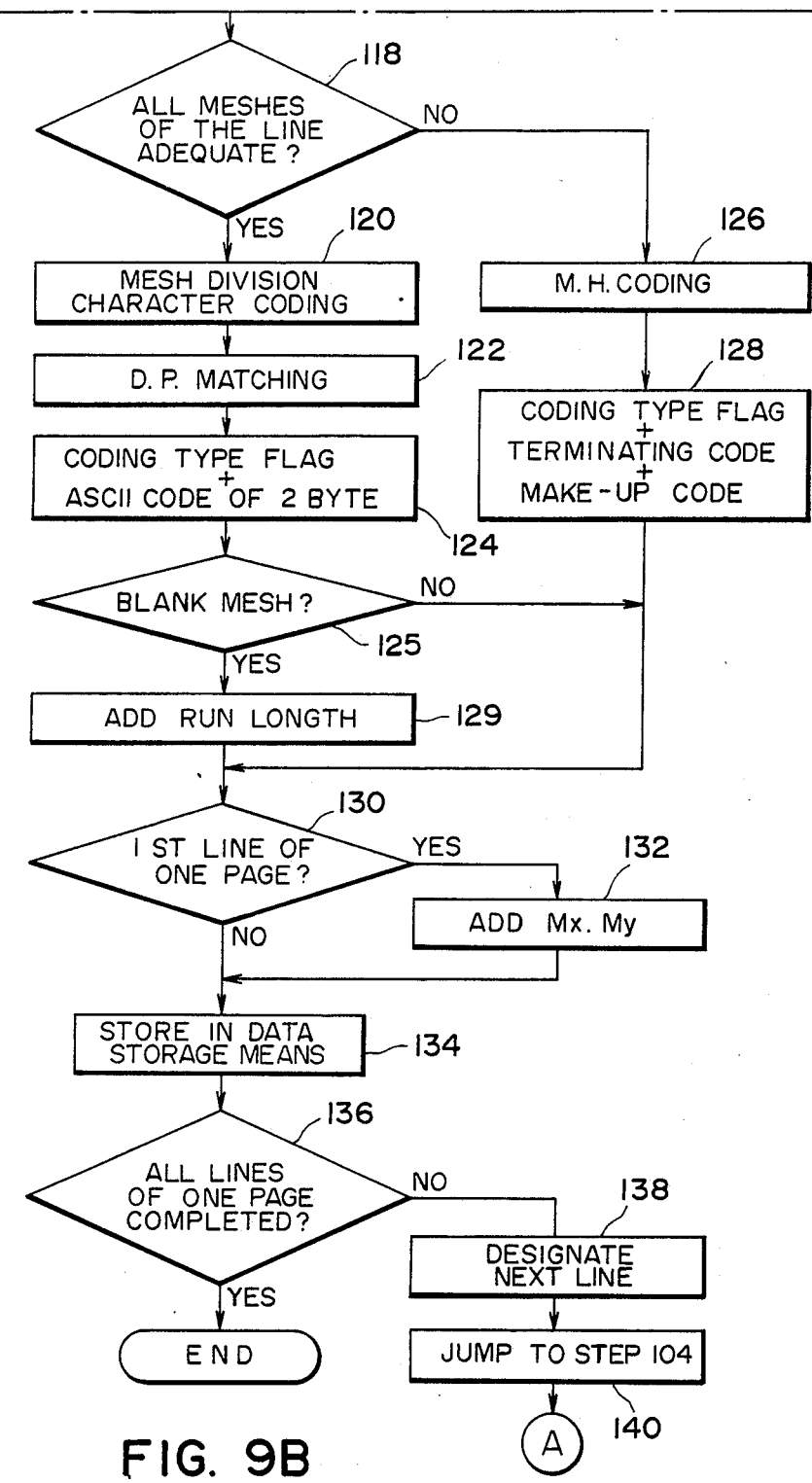

The control flow of FIG. 2 will then be practically explained with reference to the flowchart of FIG. 9.

In step 100, the mesh size $M_x$ and $M_y$ is determined by way of the above-mentioned method.

<STEP 102>

The image signal of one page in the page memory 5 is divided into the meshes of $M_x \times M_y$.

<STEP 104>

One line of the mesh columns with the width $M_y$ in the y direction is taken out.

<STEP 106>

The image signal is sequentially taken out on one-mesh unit basis from one line taken out in step 104.

<STEP 108>

A check is made to see if one or more black dots exist in the area other than the character area of the mesh. The images of the characters of different sizes, photographs, etc. and the characters of a regular size are discriminated. When black dots exist (YES), the mesh is determined to be inadequate in step 114.

<STEP 110>

When no black dot exists (NO) in the area other than the character area as the result of the discrimination in step 108, a check is further made in step 110 to see if one or more black dots exist on the Y axis and a check is made to see if a straight line which is parallel to the X-axis direction exists in the mesh or not. If NO in step 110, the mesh is determined to be inadequate (step 114).

In any of the above cases, when no black dot exists, the mesh is decided to be inadequate (step 112).

<STEP 116>

In step 116, a check is made to see if the discrimination regarding adequateness/inadequateness has been performed with respect to all meshes of the mesh columns with the width $M_y$ or not. If the discrimination of all meshes is not finished, the processing routine is returned to step 106 and the above-mentioned control flow is repeated.

<STEP 118>

After completion of the discrimination with respect to all meshes of the corresponding one mesh line, the result of the discrimination regarding adequateness/inadequateness is checked in step 118. If at least one inadequate mesh exists, the MH-coding is performed (step 126) and the code type flag representing that the MH-coding has been carried out, a make-up code, and a terminating code are produced (step 128).

<STEPs 120-129>

When all meshes in one mesh line have been determined to be adequate, the mesh division character coding is executed (step 120). The characters in the meshes are converted to the ASCII codes of two bytes by recognizing the characters in accordance with the above-mentioned DP matching method. In this case, when the mesh is the blank portion (step 125), the run length of the subsequent blank mesh is counted and this run length is subjected to the MH-coding process and added (step 129). On one hand, when the run length code is not added, steps 125 and 129 are omitted. Step 24 in FIG. 2 can be also omitted.

<STEPs 130-134>

The coding type code, terminating code, and the like of each mesh line are added, and when the mesh line is the first line of one page, $M_x$ and $M_y$ are further added as the data and stored into the data storage means 4.

<STEPs 136-140>

The processes in step 104 and subsequent steps are repeated until the discrimination of all meshes of one page has been finished.

<DECODING>

The decoding is performed in the following manner The record of each mesh line for every page is read out from the data storage means 4 and, for example, in the case of the embodiment, on the basis of the size data $M_x$ and $M_y$ of the mesh stored in the data of the first line, the line memories as many as the number of pixels x $M_y$ in the x direction are prepared and the mesh lines subjected to the MH-coding process are decoded one line by one. On the other hand, for the mesh lines subjected to the mesh division character coding process, the corresponding characters are converted on two-byte unit basis to the size such that the character can be stored in the mesh size by way of the font ROM prepared from the character codes and dropped to the dot level. It is now assumed that all areas other than the characters in the meshes are decoded as the white areas.

When the blank code is caused in the mesh lines subjected to the mesh division character coding process, these mesh lines are decoded as the run length of the blank meshes due to the subsequent decoding of the MH codes.

The above-mentioned processes are repeatedly executed for every mesh line, thereby decoding one page.

As described above, in this embodiment, attention is paid to the likelihood that most of the sizes of characters in a sheet of original are uniform, and the encoding process is performed after completion of the recognition of the characters by use of the meshes including both the blanks between lines and the characters. At the same time, in the case where the meshes are the blank meshes, attention is also paid to the fact that the blank meshes are statistically continuous, and the run length of the blank meshes is added by way of the MH-coding process, thereby further allowing the data compression to be realized. Moreover, as a modified form, if the two-dimensional run length is considered, blank meshes within a further wide range can be also data-compressed with an extremely high degree of efficiency by use of the MR codes.

As described above, according to the image processing system of the present invention, the image data with an increased data compressibility can be efficiently stored. In addition, upon decoding as well, a high-speed decoding can be performed by knowing the type and size of the area.

Further, the present invention can be also applied to the character reading technology by way of the OCR and the characters in various papers whose formats are unknown, such as newspapers, magazines and the like can be accurately and selectively read out, resulting in an improvement of a recognition factor. The data read out on a pixel unit basis can be read out by other readout method or can be displayed on a display as rejected (unreadable) characters.

The run length is not limited to the white (blank) data but the run length for the black data in the image data may be used and compressed.

As will be obviously understood from the above description, according to the invention, the image information such as characters, images or the like which cannot be encoded by way of only a single coding method is separated into respective areas and can be also encoded by the coding method in accordance with each area and further can be also decoded.

I claim:

1. An image processing system comprising:

storage means for storing a binarized document image;

dividing means for dividing the document image stored in said storage means into rectangular areas in each of which a single character is included, detected by scanning all of the document image stored in said storage means;

discriminating means for discriminating a character image area and a non-character image area included in each of said rectangular areas; and encoding means for compressing and encoding said image areas included in each of said rectangular areas on the basis of a first or second encoding method in accordance with the result of the discrimination of said discriminating means.

2. An image processing system according to claim 1, wherein said dividing means integrates the binarized image in said storage means with respect to both vertical and lateral directions of said rectangular areas and determines a size of said rectangular areas from the relation in magnitude between said integrated value and a predetermined threshold value.

3. An image processing system according to claim 1, wherein said discriminating means recognizes a position of a character image area in each of the rectangular areas on the basis of the position of a black pixel in a respective rectangular area, and said encoding means adopts, for the character image area, the first encoding method, wherein the character image area is recognized as a character and encoded, and adopts, for the non-character image area, the second encoding method, wherein the non-character image area is encoded on the basis of a unit of a pixel.

4. An image processing system according to claim 1, wherein said second encoding method is an encoding method of a dot level.

5. An image processing system according to claim 1, further comprising first and second decoding means for decoding the image information in correspondence to said first or second encoding means.

6. An image processing system according to claim 17, further comprising decoding means for reading out the image data stored in said second storage means and decoding said read-out image data for every area on the basis of the first or the second encoding method, respectively.

7. An image processing system according to claim 6, wherein said second memory means additionally stores data indicative of the encoding method for the encoded image data of each area and said decoding means decodes said image data for every area on the basis of the data indicative of the encoding method.

8. An image processing system according to claim 17, wherein said dividing means integrates the binary image with respect to both vertical and lateral directions of a rectangular area. and determines a size of said rectangular area from a relation in magnitude between said integrated value and a predetermined threshold value and said discriminating means discriminates two areas in dependence on positions of black pixels in the mesh.

9. An image processing system according to claim 8, wherein one of the areas discriminated by said discriminating means is an area in which a character is included, and said encoding means recognizes and encodes said character.

10. An image processing system according to claim 9, wherein the other one of said areas is an area in which an image other than a character is included, and said encoding means encodes said image in the other area on a pixel unit basis.

11. An image processing system according to claim 10, wherein said encoding method performs the encoding on a dot level basis.

12. An image processing system according to claim 18, wherein said predetermined size is a size including an image representative of one character stored in said memory means.

13. An image processing system according to claim 18, wherein said first encoding method is an encoding to a character code by way of character recognition.

14. An image processing system according to claim 18, wherein said second encoding method is an encoding method based on a dot level.

15. An image processing system according to claim 18, wherein said dividing means integrates a binarized image in said memory means with respect to both vertical and lateral directions of said rectangular areas and determines a size of said rectangular areas from a relation in magnitude between said integrated value and a predetermined threshold value.

16. An image processing system according to claim 8, further comprising decoding means for decoding in correspondence to said first or second encoding method.

17. An image processing system comprising:
reading means for reading an image of an original;
processing means for converting the image read by said reading means to a binarized image;
first memory means for storing the binarized image;
dividing means for dividing the image stored in said first memory means into rectangular areas each including a single character, detected by scanning all of the image stored in said first memory means;
discriminating means for discriminating a character image area and a non-character image area included in each of the rectangular areas;
encoding means for encoding the character image areas discriminated by said discriminating means, on the basis of a first encoding method and the non-character image areas on the basis of a second encoding method; and
second memory means for storing the image data encoded by said encoding means.

18. An image processing system comprising:
memory means for storing a binarized document image;
dividing means for dividing the document image stored in said memory means into rectangular areas each including a single character, detected by scanning all of the document image stored in said memory means;
discriminating means for discriminating, for each of the rectangular areas, whether or not a character image is included therein; and
encoding means for encoding an area of a character image by a first encoding method when a character image is discriminated in one of the rectangular areas by said discriminating means and encoding an area of a non-character image by a second encoding method.

19. An image processing system according to claim 18, wherein, when the image area to be encoded by the second encoding method is a blank, said encoding means adds a code indicating a run length of the blank to the encoded blank data such that the data compressing rate can be increased.

* * * * *